Figure 1:
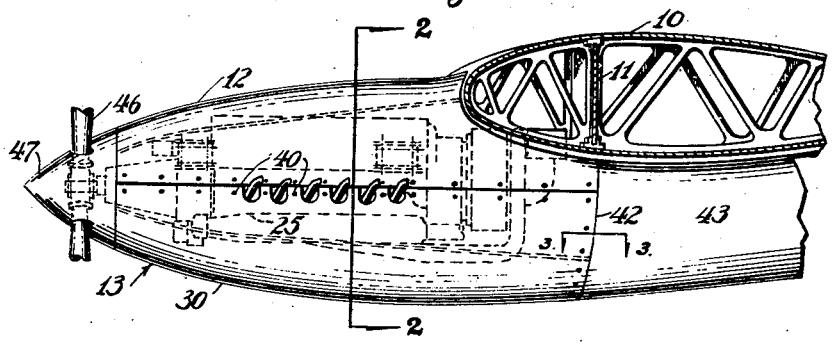

April 3, 1945.  W. P. McKINNIE  2,372,905
ENGINE NACELLE
Filed July 15, 1941

INVENTOR
WILLIAM P. McKINNIE
BY
ATTORNEY

Patented Apr. 3, 1945

2,372,905

UNITED STATES PATENT OFFICE 2,372,905

ENGINE NACELLE

William P. McKinnie, Kenmore, N. Y., assignor to Curtiss-Wright Corporation, a corporation of Delaware Application July 15, 1941, Serial No. 402,506

3 Claims. (Cl. 244—54)

This invention relates to aircraft and is particularly concerned with improvements in the mounting provisions for power plants thereof.

A particular object of the invention is to provide a streamlined power plant mounting unit of monocoque form which, however, is of such character that portions of the nacelle may be removed to provide access to the power plant. A further object of the invention is to provide a nacelle structure which shall be free of internal bracing and which combines adequate strength and rigidity to support the power plant against loads imposed by accelerations in various directions and which, in the same structure, will provide the exterior streamlined profile essential for aerodynamic cleanness.

Particularly in the mounting of "in line" engine power plants, prior practice has been to provide a skeleton mounting structure for the engine, such structure having pads to which mounting lugs on the engine are secured. To the structure and sometimes to the engine, auxiliary structure is secured to which streamlined cowling is attached. In such an arrangement, the cowling has the function only of providing aerodynamic cleanness to the power plant installation and serves little or no function in supporting the engine itself. In the arrangement here proposed, the cowling and power plant mounting structures are combined in a single unit with provisions for separating certain of the nacelle portions from one another to provide access to the power plant for servicing same and also, to provide access for removal and installation of the power plant.

Figure 2:
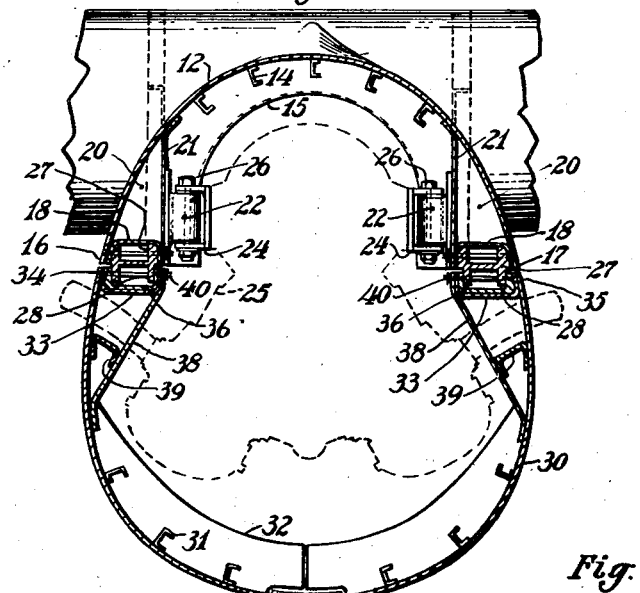
Figure 4:
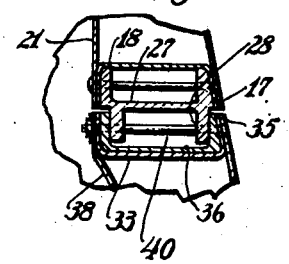
Figure 3:
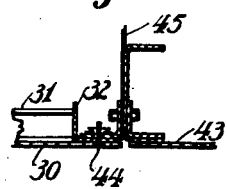

The details of the invention, along with further objects thereof, will become apparent in reading the detailed description below in connection with the drawing, in which:

Fig. 1 is a side elevation of a nacelle according to the invention, showing also a portion of a wing in section;

Figs. 2 and 3 are sections on the lines 2—2 and 3—3 respectively, of Fig. 1; and Fig. 4 is an enlarged section of a portion of Fig. 2.

Where the term "nacelle" is used throughout the specification, it is to be interpreted not only as a separate power plant carrying body separate from the fuselage of an aircraft, but also as a portion of a fuselage when the power plant is mounted in a fuselage.

In Fig. 1, a main wing 10, having a forward spar 11, carries, rigid therewith, the upper segmental portion 12 of a power plant nacelle indicated in its entirety as 13. The portion 12 comprises a sheet metal member of streamlined contour having longitudinal reinforcement 14 and transverse reinforcement 15 secured to its inner surface to endow the portion 12 with substantial strength and rigidity. At the lower edges 16 and 17 of the portion 12, reinforcements are provided comprising channels 18 extending inwardly from the edges and opening downwardly, said channels being reinforced by gussets 20 and by longitudinally extending plates 21 secured thereto. To the plates 21 engine mounting bosses 22 are secured on which the mounting lugs 24 of an engine 25 are attached as by bolts 26. Within each channel 18 is a longitudinally extending filler member 27 having laterally spaced tongues 28 extending therebelow, these tongues lying below the horizontal plane which passes adjacent the edges 16 and 17. In the design of the upper segmental portion 12 it is contemplated that it will be made sufficiently strong and rigid to support the power plant 25 under static and engine testing conditions on the ground. However, loading under dynamic flight conditions on the engine mount will be far in excess of ground loading and it is intended that the portion 12, by itself, be incapable of supporting the engine under the full dynamic load conditions. The strength of the portion 12 is augmented for dynamic loading by a lower nacelle portion 30 which embraces that part of the engine which lies below the edges 16 and 17 and provides a streamlined cover therefor. The lower nacelle portion 30 is provided with longitudinal and transverse reinforcement 31 and 32 respectively on the inner face thereof and is further provided with channels 33 at its upper edges 34 and 35 in which are inserted grooved fillers 36 within which the tongues 28 are fitted. The channels 33 are reinforced by plates 38 and braces 39 so that they are rigid with the lower nacelle portion 30. The members 27 and 36 are provided with a plurality of alined holes throughout their length for the insertion of bolts 40 by which the upper and lower nacelle portions 12 and 30 are secured rigidly to one another and whereby the strength of the lower portion 30 is combined with that of the upper portion 12 to support the power plant 25 against all loads to which it may be subjected during flight. The rearward edge 42 of the lower nacelle portion 30 overlies a streamlined fairing 43, shown in Figs. 1 and 3, which is reinforced by a bulkhead 45 which, with the web of the spar 11 provides the usual fire wall at the rear of the engine compartment.

As is conventional, a propeller 46 is mounted on the front end of the engine 25 and the propeller may carry, if desired, a spinner 47 whose longitudinal profile is coordinated with the profile of the nacelle 13.

Although the drawings show an inverted in-line V engine, it is obviously within the scope of the invention to utilize upright power plants or power plants of other type and it is wholly within the realm of those skilled in the art to adapt the engine mounting provisions to any one of the several nacelle portions to make the power plant most accessible. For instance, if an upright V type engine be used, it would normally be mounted upon the lower nacelle portion while the upper nacelle portion would be removable to give access to the engine. In such an installation, the lower nacelle portion would be rigid with the aircraft structure while the upper portion would be detachable therefrom.

As a further aid to accessibility, the lower nacelle portion 30 is shown in Fig. 2 as being in two parts secured together at the bottom by a "piano hinge" 48 having an axially removable mandrel 49. Should the axis of the "piano hinge" be straight, it would be unnecessary to have a removable mandrel but since in the present embodiment the lower profile of the nacelle is curved, as shown in Fig. 1, it would be impossible to open the two lower cowl portions on the curved axis of the hinge 48.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft, a power plant supporting nacelle secured at one end only to the aircraft structure and extending outwardly therefrom as a cantilever beam, said nacelle comprising a tube-like assembly longitudinally split into at least first and second nacelle sections, each of said sections comprising a sheet-like outer portion with internal longitudinal reinforcing means, reinforcing means along the interior of each longitudinal edge of said first section, said reinforcing means comprising longitudinally extending upstanding tongue means, reinforcing means along the interior of each longitudinal edge of said second section, said second mentioned reinforcing means comprising longitudinally extending groove means adapted to receive said tongue means, said tongue and groove means having alined holes substantially normal to the surface of said nacelle, pin means adapted to pass through said alined holes for detachably securing said sections together, and means within one of said sections for securing said power plant thereto.

2. In an aircraft, a power plant supporting nacelle secured at one end only to the aircraft structure and extending outwardly therefrom as a cantilever beam, said nacelle comprising a tube-like assembly longitudinally split into at least first and second nacelle sections, each of said sections comprising a sheet-like outer portion with internal longitudinal reinforcing means, reinforcing means along the interior of each longitudinal edge of said first section, said reinforcing means having a flange substantially parallel to said sheet-like outer portion, reinforcing means along the interior of each longitudinal edge of said second section, said second mentioned reinforcing means having a pair of flanges substantially parallel to each other and to said sheet-like outer portion and adapted to lie on each side of said first-mentioned flange, said flanges having alined holes substantially normal to the surface of said nacelle, pin means adapted to pass through said alined holes for detachably securing said sections together, and means within one of said sections for securing said power plant thereto.

3. In an aircraft, a power plant supporting nacelle secured at one end only to the aircraft structure and extending outwardly therefrom as a cantilever beam, said nacelle comprising a tube-like monocoque assembly longitudinally split into at least first and second nacelle sections, each of said sections comprising a sheet-like outer portion with internal longitudinal reinforcing means, reinforcing means along the interior of each longitudinal edge of said first section, said reinforcing means having flange means substantially parallel to the adjacent longitudinal edge, reinforcing means along the interior of each longitudinal edge of said second section, said second mentioned reinforcing means having a pair of flange means substantially parallel to each other and to their adjacent longitudinal edge and adapted to lie on each side of said first mentioned flange means, said flange means having alined holes substantially normal to the surface of said nacelle, pin means adapted to pass through said alined holes for detachably securing said sections together, and means within one of said sections for securing said power plant thereto.

WILLIAM P. McKINNIE.